US012393619B1

United States Patent
Bhura et al.

(10) Patent No.: US 12,393,619 B1
(45) Date of Patent: Aug. 19, 2025

(54) SYSTEMS AND METHODS FOR GENERATING A TARGETED DOCUMENT SET FOR INPUT TO A GENERATIVE MODEL

(71) Applicant: JPMORGAN CHASE BANK, N.A., New York, NY (US)

(72) Inventors: Tuhin Bhura, Kolkata (IN); Shashanka Narayan, Chicago, IL (US); Santosh Chikoti, Monroe Township, NJ (US); Saurabh Tiwari, Bangalore (IN); Ashwarya Gupta, Bangalore (IN); Vikas Kundalpady, Bengaluru (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/612,687

(22) Filed: Mar. 21, 2024

(30) Foreign Application Priority Data

Feb. 7, 2024 (IN) .............................. 202411008402

(51) Int. Cl.
*G06F 16/33* (2025.01)
*G06F 16/3329* (2025.01)
*G06F 16/334* (2025.01)
*G06F 40/284* (2020.01)

(52) U.S. Cl.
CPC ...... *G06F 16/3329* (2019.01); *G06F 16/3347* (2019.01); *G06F 40/284* (2020.01)

(58) Field of Classification Search
CPC . G06F 16/3329; G06F 16/3349; G06F 40/284
See application file for complete search history.

(56) References Cited

U.S. PATENT DOCUMENTS

| 2017/0061330 | A1* | 3/2017 | Kurata | G06F 16/3344 |
| 2021/0216576 | A1* | 7/2021 | Staub | G06Q 30/0282 |
| 2024/0289360 | A1* | 8/2024 | Chepkwony | G06F 16/3328 |

* cited by examiner

*Primary Examiner* — Loc Tran
(74) *Attorney, Agent, or Firm* — GREENBERG TRAURIG LLP

(57) ABSTRACT

In some aspects, the techniques described herein relate to a method including: receiving, at a query platform, a query and a document identifier; determining, based on the document identifier, a document-type parameter; generating, based on metadata related to the document-type parameter, an optimized query; generating a query vector embedding from the optimized query; executing a lexical search on a document pool, wherein the lexical search is based on the optimized query, and wherein the lexical search returns a first document set; executing a contextual search on a vector database, wherein the contextual search is based on the query vector embedding and returns a second document set; and generating a targeted document set from the first document set and the second document set.

12 Claims, 4 Drawing Sheets

SYSTEMS AND METHODS FOR GENERATING A TARGETED DOCUMENT SET FOR INPUT TO A GENERATIVE MODEL

RELATED APPLICATIONS

This application claims priority to, and the benefit of, Indian Provisional Patent Application No. 202411008402, filed Feb. 7, 2024, the disclosure of which is hereby incorporated, by reference, in its entirety.

BACKGROUND

1. Field of the Invention

Aspects generally relate to systems and methods for generating a targeted document set for input to a generative model.

2. Description of the Related Art

Generative machine learning models, such as large language models (LLMs), are capable of content generation, where the generated content is based on data in a collection of pre-generated content (e.g., a document pool) that the model has access to. A drawback to model-generated content is that a model may generate irrelevant content, and/or so-called "hallucinations," due to inclusion of data drawn from irrelevant or unrelated sources (e.g., documents) that may be included in the collection of pre-generated content. Accordingly, in order to reduce the probability of inaccuracy or irrelevancy in model-generated content, it is beneficial to target input to the model such that the input data has a high degree of relevancy with respect to the received query.

SUMMARY

In some aspects, the techniques described herein relate to a method including: receiving, at a query platform, a natural language query and a document identifier; determining, based on the document identifier, a document-type parameter; generating, based on metadata related to the document-type parameter, an optimized query; generating a query vector embedding from the optimized query; executing a lexical search on a document pool, wherein the lexical search is based on the optimized query, and wherein the lexical search returns a first document set; executing a contextual search on a vector database, wherein the contextual search is based on the query vector embedding and returns a second document set; and generating a targeted document set from the first document set and the second document set.

In some aspects, the techniques described herein relate to a method, including: sending the targeted document set and the natural language query to a generative model.

In some aspects, the techniques described herein relate to a method, including: receiving, from the generative model, a response to the natural language query.

In some aspects, the techniques described herein relate to a method, wherein the contextual search returns the second document set based on a mathematical similarity measurement between the query vector embedding and chunk vector embeddings related to documents in the second document set.

In some aspects, the techniques described herein relate to a method, wherein the natural language query is the optimized query.

In some aspects, the techniques described herein relate to a method, wherein the lexical search matches terms in the optimized query to metadata tags related to text chunks.

In some aspects, the techniques described herein relate to a method, wherein the text chunks are related to documents included in the first document set.

In some aspects, the techniques described herein relate to a system including at least one computer including a processor and a memory, wherein the at least one computer is configured to: receive, at a query platform, a natural language query and a document identifier; determine, based on the document identifier, a document-type parameter; generate, based on metadata related to the document-type parameter, an optimized query; generate a query vector embedding from the optimized query; execute a lexical search on a document pool, wherein the lexical search is based on the optimized query, and wherein the lexical search returns a first document set; execute a contextual search on a vector database, wherein the contextual search is based on the query vector embedding and returns a second document set; and generate a targeted document set from the first document set and the second document set.

In some aspects, the techniques described herein relate to a system, wherein the at least one computer is configured to: send the targeted document set and the natural language query to a generative model.

In some aspects, the techniques described herein relate to a system, wherein the at least one computer is configured to: receive, from the generative model, a response to the natural language query.

In some aspects, the techniques described herein relate to a system, wherein the contextual search returns the second document set based on a mathematical similarity measurement between the query vector embedding and chunk vector embeddings related to documents in the second document set.

In some aspects, the techniques described herein relate to a system, wherein the natural language query is the optimized query.

In some aspects, the techniques described herein relate to a system, wherein the lexical search matches terms in the optimized query to metadata tags related to text chunks.

In some aspects, the techniques described herein relate to a system, wherein the text chunks are related to documents included in the first document set.

In some aspects, the techniques described herein relate to a non-transitory computer readable storage medium, including instructions stored thereon, which instructions, when read and executed by one or more computer processors, cause the one or more computer processors to perform steps including: receiving, at a query platform, a natural language query and a document identifier; determining, based on the document identifier, a document-type parameter; generating, based on metadata related to the document-type parameter, an optimized query; generating a query vector embedding from the optimized query; executing a lexical search on a document pool, wherein the lexical search is based on the optimized query, and wherein the lexical search returns a first document set; executing a contextual search on a vector database, wherein the contextual search is based on the query vector embedding and returns a second document set; and generating a targeted document set from the first document set and the second document set.

In some aspects, the techniques described herein relate to a non-transitory computer readable storage medium, including: sending the targeted document set and the natural language query to a generative model.

In some aspects, the techniques described herein relate to a non-transitory computer readable storage medium, including: receiving, from the generative model, a response to the natural language query.

In some aspects, the techniques described herein relate to a non-transitory computer readable storage medium, wherein the contextual search returns the second document set based on a mathematical similarity measurement between the query vector embedding and chunk vector embeddings related to documents in the second document set.

In some aspects, the techniques described herein relate to a non-transitory computer readable storage medium, wherein the natural language query is the optimized query.

In some aspects, the techniques described herein relate to a non-transitory computer readable storage medium, wherein the lexical search matches terms in the optimized query to metadata tags related to text chunks, and wherein the text chunks are related to documents included in the first document set.

DETAILED DESCRIPTION

Figure 1:
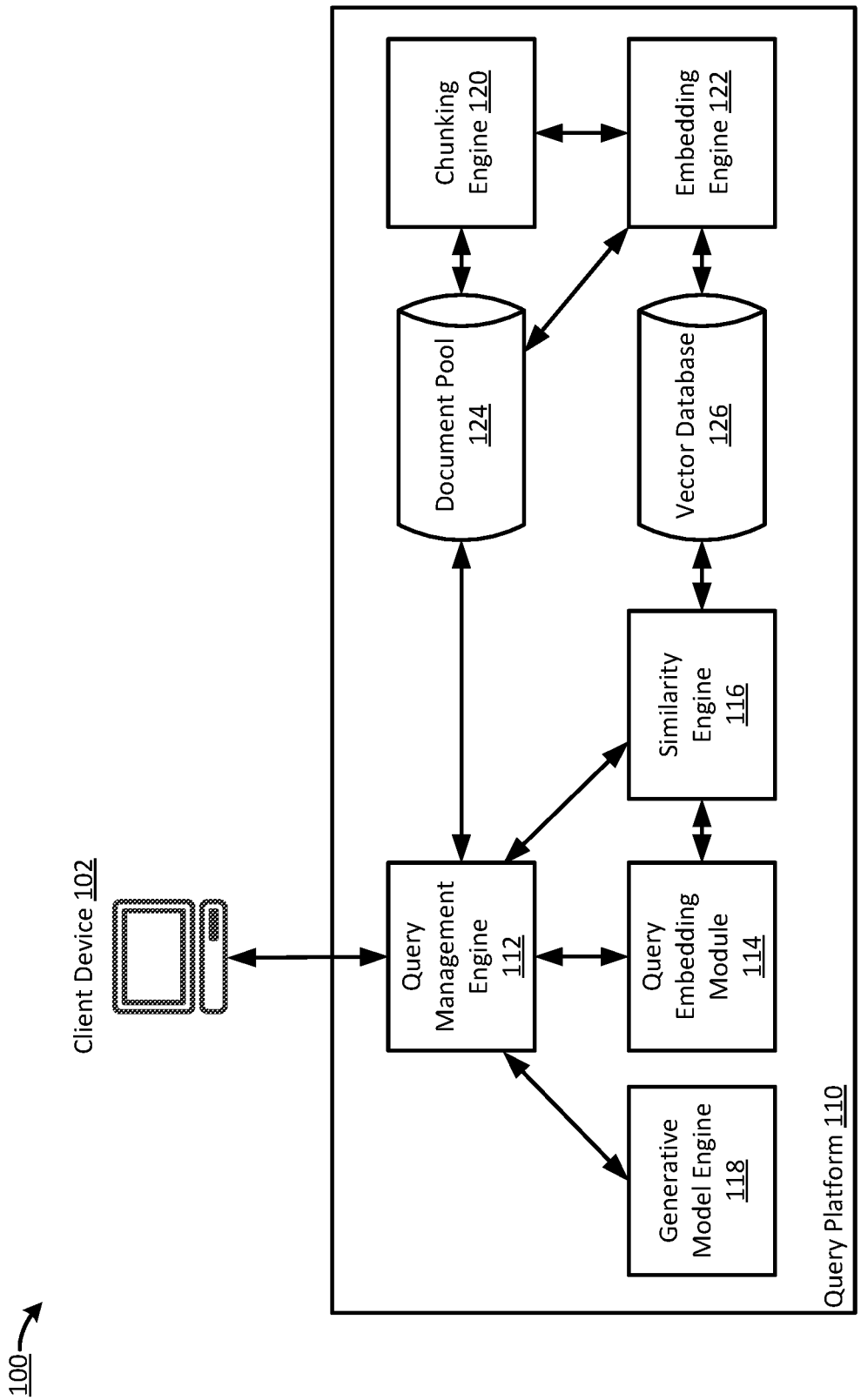
FIG. 1 is a block diagram of a system for generating a targeted document set for input to a generative model, in accordance with aspects.

Aspects generally relate to systems and methods for generating a targeted document set for input to a generative model.

A promising use of generative models involves the efficient generation of content that must be extracted from various parts of a particular document or from various documents. A generative model, such as a large language model (LLM) may be trained to generate documents and document sections that would require human composers to locate related documents and sections therein, read and comprehend the located sections, and recreate the located sections in a new document based on a comprehension of the located sections and an application of factual information related to the new document (e.g., terms of a business transaction). This process is generally very time intensive, and a generative model may perform these tasks in a fraction of the time that even a very experienced person could.

Examples of the above scenario may include a document whose terms capture loan pricing information. For instance, a loan pricing document generally includes language that determines how much interest a borrower will pay for a particular loan. To generate such a document conventionally, language describing, e.g., an annual percentage rate (APR) and any formulas needed to arrive at the APR must be read and understood by a human actor from an existing document. Additional sections of an existing document may hold definitions. In generating a new loan pricing document, even where an existing document is used as a template, a human actor may need to find, read, understand, and update many, or perhaps more, of the listed paragraphs, sections, etc. But finding and interpreting this language can be difficult and time consuming.

Another exemplary scenario is a liquidity eligibility document. A liquidity eligibility document is a document that is provided to an institution (e.g., a central banking institution) that determines whether, and/or requests, that a particular loan associated with the document be eligible for a liquidity offering (e.g., a disbursement) from the central banking institution. A liquidity eligibility document requires information from a number of documents (i.e., a document package) for completion. Conventionally, a human actor must search through the document package and extract the required information in order to complete the liquidity eligibility document. The required information is used to answer a set of questions posed by the liquidity eligibility document. While a liquidity eligibility document is generally completed after a majority of loan processing for an associated loan has been executed, aspects described herein may provide for a determination of eligibility prior to, or parallel with, loan processing.

Still another exemplary scenario document is a covenant section of a document. A covenant section of a legal document often describes action items that a party to an agreement must take periodically. For instance, a covenant section of a document may indicate that a party receiving a loan must provide certain information on a periodic basis. For instance, a party's financial statements may need to be provided quarterly, every 90 days, or at some other interval. Conventionally, credit agreements are set up in a loan processing system and a human actor must manually draft in the time periods in a covenant section describing when the recurring documentation (e.g., a financial statement) must be delivered.

In each exemplary scenario described above, and in others, a generative model may be leveraged to generate content required by documents, forms, etc., that may be extracted from similar, previously completed documents in a fraction of the time it would take a human actor to do so. For instance, a generative model may generate an answer to a query (e.g., a natural language query) that requests an interest rate and a formula for a particular type of loan (e.g., a revolving line of credit). Documents from a document pool (e.g., a legal document pool) may be used as input to the model, and the model may provide output describing (e.g., in natural language) an appropriate interest rate and a formula used to calculate the interest rate. Due to the required accuracy of certain documents, however, a conventional document collection may not produce results that are precise enough. This may be due to a lack of targeted model input data.

Aspects described herein may provide techniques for generating a targeted document set, where the targeted document set includes a set of input documents that are highly relevant to a received query. The relevancy may be based on both a contextual search and a lexical search that, when combined, targets highly relevant documents for input to a generative model. Documents that are determined to be both contextually and lexically related to an input query may be collected into a document set and provided as input to a generative model along with the received input query. A combination of contextually and lexically related documents may produce more accurate results from a generative model than documents determined from a contextual search alone.

Aspects may provide a document collection or document pool that is a data store of documents. Documents in a document pool may include any form of unstructured data, such as word processor documents, portable document format (.pdf) documents, text (.txt) files, webpages (e.g., HTML format), etc. An exemplary document pool may be or include a knowledge base repository of an implementing organization. For instance, an implementing organization may maintain a knowledge base of articles in any suitable format. A document pool may contain documents of a particular type, such as legal documents. A document pool may store documents in a document's native format (e.g., a word processor format, a .pdf format, a .txt format, an HTML format, etc.). A document pool may be any suitable electronic storage architecture, such as a relational database, a data lake, a data warehouse, or any other suitable datastore.

In accordance with aspects, documents in a document pool may include text-based documents or image-based documents. In some aspects, a chunking engine may include an optical character recognition (OCR) engine. An OCR engine may generate text from any input documents that are image-based. An OCR procedure may be carried out prior to a chunking process. Accordingly, if an image-based document is received by a chunking engine, the chunking engine may first process the image-based document with an OCR process of an OCR engine in order to generate text from the image-based document. The generated text may then be parsed and further processed with a chunking process to generate text chunks associated with the document, as described herein.

In accordance with aspects, a chunking engine may also be provided. A document chunking engine may receive documents (e.g., documents stored in a document pool) as input. A chunking engine may execute a chunking process that chunks (e.g., tokenizes) text included in a received document. A chunking process may divide a document into one or more portions of text (i.e., one or more "text chunks" or "tokens"). Each portion may be a collection of one or more words and may be referred to as a text chunk or a token. Documents may be divided into text chunks based on single words, word phrases, sentences, paragraphs, sections, chapters, etc., up to the text of an entire document. Multiple chunks may be joined to find a best context for a LLM. For example a first chunk may be from a first document at a 5th page of the first document. A second chunk may be from a second document at a 3rd page of the second document. The first chunk and the second chunk may be joined to form a best context for a LLM.

With respect to each document portion, a chunking process may split text on white space, may remove punctuation and stop words, and may retain words and/or terms that are useful in a semantic evaluation of a document's contents to generate a text chunk. Text chunks may be stored in an appropriate data store with a relation, or association, to the document from which the text chunk was generated. For example, a text chunk may be stored in a datastore with a relationship to a unique document identifier (a document ID), where the unique document identifier identifies the document from which the text chunk was generated. In some aspects, text chunks generated from documents stored in a document pool may also be stored in the document pool. In other aspects, text chunks may be stored separately (i.e., in a separate storage location). Text chunk storage may take any suitable format (e.g., a relational database, etc.).

In accordance with aspects, a chunking engine may be configured to split text at recognizable points of a legal document. For instance, a chunking engine may split a document at an article level, a section level, a subsection level, etc. Splitting the text of documents is discussed in further detail in U.S. patent application Ser. Nos. 18/458,078 and 18/458,066, the disclosure of each of which is incorporated herein, by reference, in its entirety.

In accordance with aspects, text chunks may be tagged with metadata. A text chunk, as described herein, may include all metadata tags that the text chunk has been tagged with (i.e., associated with). The metadata may be descriptive of the content of the text in the text chunk. Metadata may further include keywords that may generate relevant results based on a lexical search (i.e., a search that matches literal words). Metadata may be further based on the parent document from where the text chunk was generated. Metadata tags that are generated for a text chunk may be stored with the associated text chunks in a document pool, a text chunk datastore, etc. Metadata tags may be identified based on a text chunk's statistical features that are extracted from a corresponding document and/or text chunk. Any metadata tags with low term frequency-inverse document frequency (TF-IDF) score, which is a measure of importance of a word to a document in a collection or corpus, may be removed.

Aspects may further include an embedding engine. An embedding engine may generate a chunk vector embedding that is associated with a document or a text chunk generated from a document. A chunk vector embedding is a vector representation (i.e., a numeric representation) of a semantic meaning of text included in a text chunk or a group of text chunks generated from document text chunks. Chunk vector embeddings may be used, mathematically, to determine a relative similarity between respective text chunks from which the vector embeddings were generated. For instance, given several chunk vector embeddings associated with respective text chunks, two chunk vector embeddings that are relatively more similar in terms of a mathematical similarity measurement (e.g., cosine distance) will indicate a closer semantic similarity among their respective associated text chunks. That is, the more similar a text chunk's vector embedding(s) is/are to another text chunk's vector embedding(s) (using a similarity measure), the closer these text chunks will be in terms of semantics (i.e., semantic data, meaning, etc.).

In accordance with aspects, a chunk vector embedding may be generated from one or more text chunks, as is necessary or desired. That is a chunk vector embedding may be generated from one or more text chunks that are associated with a given document. In some aspects, a chunk vector embedding may be generated from all text chunks that have been generated from a document's text. In this case, the relevant chunk vector embedding would represent the semantic meaning of the text of the entire document. In other aspects, chunk vector embeddings may be generated from a single text chunk of a document. In this scenario, the chunk vector embedding would represent only the semantic meaning of the article, section, subsection, paragraph, etc., from which the vectorized text chunk was generated. In some aspects, metadata tags associated with a text chunk may be embedded with the text from the text chunk.

In accordance with aspects, a chunking engine and/or an embedding engine may be configured to parse documents in a document pool and generate text chunks and corresponding embeddings (respectively) for documents in a document pool. A chunking engine may be in operative communication with a document pool and may be configured to iterate through documents stored in the document pool and generate one or more text chunks for each document in the document pool. The embedding engine may pass each generated text chunk to an embedding engine, which may generate a chunk vector embedding from each received text chunk. In another aspect, an embedding engine may retrieve text chunks directly from a text chunk datastore, such as a document pool, and generate chunk vector embeddings from the retrieved text chunks.

A chunking engine and/or an embedding engine may be configured to parse a document pool or other datastore and generate updated text chunks or embeddings (respectively) based on content that has changed since a last text chunk/embedding generation. That is, a chunking engine and/or embedding engine may be configured to determine changes in documents stored in a document pool and generate updated output that accurately reflects the change in content in the stored documents. Moreover, a chunking engine and/or an embedding engine may be configured to chunk and vectorize new documents that are added to a document pool, as described herein.

Aspects may store generated chunk vector embeddings with a reference or association to the text chunk whose semantic meaning the corresponding chunk vector embedding represents. That is, if a given chunk vector embedding represents "Text Chunk A," then the given chunk vector embedding may be stored with a relation or association to Text Chunk A. The reference, relation, association, etc., may be, e.g., a unique document identifier (a document ID) that may be used as a lookup key, such as a primary key, which may be further used to retrieve an associated text chunk from a datastore.

Accordingly, a text chunk that is associated with a chunk vector embedding may be retrieved from a datastore (such as a document pool) by first retrieving the document identifier that is stored with the chunk vector embedding, and then generating a query of a datastore that retrieves the document associated with the document ID from the datastore. In some aspects, a single identifier, such as a unique document identifier, may interrelate a source document, a text chunk generated from the source document, and a chunk vector embedding generated based on the text chunk that is related to the source document.

In accordance with aspects, chunk vector embeddings generated by an embedding engine may be stored in a vector database. A vector database is a database that is optimized for storing, indexing, searching, and retrieving vectors, such as vectors that are included in chunk vector embeddings. A vector database may be optimized for use with a similarity engine and a similarity measurement function.

In accordance with aspects, a query management engine may be configured to receive a query (e.g., a natural language query) from a user interface. A received query may also include a document identifier. That is, a user of the query interface may select a document that is relevant to the user's input query. The selected document may be stored in a document pool. A query management engine may be further configured to evaluate the received query and the received document identifier and generate an optimized query from the received query. A document identifier may be mapped to, or otherwise associated with, a document-type parameter. A document-type parameter may include a description or other metadata that describes a document's contents. A document type may include keywords that are relevant to the document. Based on the determined document type, the query may be optimized to include keywords that are related to the document type. Keywords that are added to an optimized query may reflect metadata tags that are associated with text chunks generated from documents in a document pool. Some aspects may include a provision for a subject matter expert to add their understanding to a query. For instance, if a query is "what is the effective date defined in the document?" a subject matter expert may add one more queries such as "What is the closing date defined in the document". Subject matter expert input may make the queries and results more domain specific and accurate. Query optimization may incorporate one-to-many mappings. Accordingly, an input to query optimizer may receive one query but it may output more than one query.

In accordance with aspects a query platform may perform a lexical search of a document pool based on an optimized query. For instance, a query management engine may search a document pool using an optimized query and a lexical search where the lexical search returns text chunks and/or documents related to text chunks based on matching between terms in the optimized query and metadata tags associated with text chunks and actual text from the text chunks. The search may retrieve a first document set that is based on relevancy with respect to the lexical search. The first document set may include a top N number of results. The first document set may be retrieved from a document pool based on a query of the document pool including document identifiers of the relevant documents.

In accordance with aspects, a similarity engine may be provided as a component of a query platform. A similarity engine may be configured to receive a query vector embedding from a query embedding module. In some aspects, the query may be an optimized query, as described herein. A similarity engine may be configured to search a vector database and determine and/or retrieve a number of chunk vector embeddings that are similar to the received query vector embedding. This may be referred to as a contextual search, since the search is based on a document or text chunk's context as represented by a vector embedding. For instance, the similarity engine may be configured to determine the top N most similar chunk vector embeddings with respect to a received query vector embedding (e.g., a top-N analysis). A determination of similarity between a query vector embedding and a chunk vector embedding may be made using a mathematical similarity measurement, such as cosine distance. Any suitable similarity measurement or measurement function may be used in determining similarity.

In accordance with aspects, a similarity engine may be configured to determine a document identifier that is associated with each chunk vector embedding that is determined to be above a similarity threshold (e.g., each chunk vector embedding that is determined to be in the top N most similar embeddings) with respect to a received query vector embedding. A query platform (e.g., a query management engine) may be configured to receive each determined document identifier and query a document pool using the determined document identifiers to retrieve each document and/or each text chunk that is associated with the determined similar chunk vector embeddings.

Documents retrieved based on a contextual search may be included in a second document set. Aspects may combine documents from a first document set bast on a lexical search and a second document set based on a contextual search to generate a targeted document set. In an exemplary aspect, a target document set may include a percentage of documents from each of the first and second document sets. The relative percentages may vary based on different factors. Multiple chunks to may be combined to form a best context for an LLM to work with. For instance, 25% of text chunks may be selected based on a lexical search (e.g., a first document set) and 75% of chunks may be selected based on a contextual search (e.g., a second document set). After removing any duplicates, a final context to be sent to and used by an LLM may be generated from the selected chunks.

Aspects may include or have access to a generative model platform or engine. A generative model engine may provide access to a generative machine learning model. Exemplary generative machine learning models include large language models (LLMs), such as a generative pretrained transformer (GPT) model. A generative model engine may provide access to any suitable generative model, and to an interface for submitting data (e.g., a targeted data set) to the model as input and receiving data from the model as output.

Aspects may utilize a private generative model engine or public generative model engine. A public model engine, for instance, may be offered as a commercial service, where the commercial service provides a public interface that may be accessed by customers of the commercial service. A private model engine may be maintained and configured by an implementing organization for use by the implementing organization.

In accordance with aspects, an interface to a generative model engine may accept data as input to the generative model engine and/or to a generative model included and executed therein. The interface may be an API interface that publishes API methods that may be called by other platform components. For instance, an API method may be called programmatically by a query management engine. The API method may specify optional or mandatory data parameters (also called arguments) that may be provided as input to the API and, in turn, the publishing generative model engine.

In accordance with aspects, a generative model engine may be configured to receive text data including a targeted document set, or text chunks generated from documents in a targeted document set, as input to the model. For instance, an exemplary model may be configured to receive, via an interface, one or more text chunks generated from documents e.g., in a targeted document set. In other aspects, a generative model engine may be configured to receive documents included in the targeted document set. Further, a generative model may be configured to receive, via an interface, a unique document identifier that is associated with each received document and/or text chunk. A generative model engine may additionally be configured to receive a query text string. These data may be received, e.g., as method parameters of a method exposed by an API of the generative model engine.

In accordance with aspects, a query management engine may be configured to receive document identifiers from, e.g., a similarity engine, and to execute a query of a document pool, where the query is formatted to retrieve/return each document and/or each text chunk that is associated with each document identifier included in the query by the query management engine. As used herein, the term textual document data refers to any combination of documents or text chunks that is returned in a query based on associated document identifiers, that is included in a targeted document set, and/or that is sent to a generative model engine for analysis. A query management engine may then be configured to pass textual document data and corresponding document identifiers to a generative model. A query management engine may be further configured to pass a query text string to a generative model. For instance, an API method may be exposed by a generative model engine and the API method may be called by a query management engine. A query management engine may include data parameters in the exposed API method. Data parameters may include textual document data (i.e., documents and/or text chunks), associated document identifiers, and a query text string.

In accordance with aspects, a generative model engine may be configured to receive a query text string and textual document data, and to formulate a natural language response to the query text string based on the text in the one or more received documents. A generative model included in a generative model engine may be trained on public or private documents to generate natural language responses to a received query based on a set of documents. In some aspects, however, an organization may wish to limit the number and scope of documents from which a generative model may generate a response to a query. This limited document set may be provided particularly due to its relevance to the submitted query. For instance, the limited document set may be based on a targeted document set.

In some aspects, an API method exposed by a generative model engine may include an instructional parameter that instructs the model engine to generate a response using only textual data (e.g., received documents and/or text chunks) received from a query platform (i.e., only textual document data received from the calling platform). In other aspects, an API method may call functions of a generative model engine that are configured to generate responses based only on textual data (e.g., document textual data) that is received with the method call. That is, a model engine may be instructed, configured, etc., to generate a response based on textual document data received from a calling platform (e.g., a targeted document set), and may not base a response on documentation outside of that received from a calling platform. In this way, the response to a received query will be generated based on a limited universe of documentation that may be supplied by a calling platform and that may be particularly provided by the calling platform due to the documentation's relevance to the submitted query.

In accordance with aspects, a generative model engine may return (e.g., as a return response to a called API method) a natural language response to a received query text string. The response may be generated based on textual document data received by the generative model engine. A response may further include one or more document identifiers that are associated with documents that the generative model engine used to generate the natural language response. The natural language response may be received by the calling platform (e.g., a query platform or a query management engine of a query platform). Additionally, the platform may receive document identifiers of the documents used to generate the response.

Upon receipt of a natural language response from a generative model engine, a query management engine may send the response to an interface (e.g., a user interface). For instance, a query management engine may send the natural language response generated by a generative model to a graphical user interface for viewing/reading of the response by an end user. The query management engine may also include one or more document identifiers associated with the documents that were used by the generative model engine to generate the natural language response. In this way, an end user may be able to access the textual document data using the supplied document identifier(s). In an exemplary aspect, a query management engine may provide the document identifier as a hyperlink, where the hyper link is configured to open a document that is associated to the hyperlinked document identifier, providing an end user with streamlined access to the relevant document.

FIG. 1 is a block diagram of a system for generating a targeted document set for input to a generative model, in accordance with aspects. System 100 includes query platform 110. System 100 and query platform 110 may be part of the technology infrastructure of an implementing organization. Query platform 110 includes query management engine 112, query embedding module 114, similarity engine 116, and generative model engine 118. Query platform 110 further includes chunking engine 120, embedding engine 122, document pool 124, vector database 126, and client device 102.

In accordance with aspects, document pool 124 may be a document repository and may be any suitable data store (e.g., a relational database, a data lake, etc.). Chunking engine 120 may be configured to be in operative communication with document pool 124 and may be configured to iterate through documents stored in document pool 124 and process the documents with a chunking process. A chunking process of chunking engine 120 may generate text chunks related to the documents stored in document pool 124 as described in more detail herein. Chunking engine 120 may then store the generated text chunks with a reference to a document identifier, where the document identifier relates one or more text chunks generated from a document to the document.

In accordance with aspects, embedding engine 122 may be configured to generate chunk vector embeddings from text chunks. Embedding engine 122 may generate chunk vector embeddings and store the chunk vector embeddings in vector database 126. The chunk vector embeddings may be stored with the document identifier that is associated with the corresponding text chunk from which the chunk vector embedding was generated. This document identifier may further be related to the relevant document, thereby associating the source document, any text chunks generated from the source document and any chunk vector embeddings generated from the corresponding text chunks.

As noted herein, chunking engine 120 and embedding engine 122 may periodically or continually parse documents stored in document pool 124 to identify updates and/or new documents and may perform chunking and vector embedding processes in order to maintain up-to-date text chunks and corresponding vector embeddings that correspond to the documents stored in document pool 124. This may be done periodically, or in real time (e.g., as a document is added or updated).

In accordance with aspects, query management engine 112 may provide (e.g., as a published web page, an application, etc.) an interface and the interface may provide a natural language query prompt. Client device 102 may be configured to access the interface via a web browser, installed application, etc. An end user of client device 102 may provide a natural language query as input to the natural language query prompt. For instance, an end user of client device 102 may type a natural language query into the prompt and may submit the query. Query management engine 112 may receive the query and may pass the natural language query as a query text string to query embedding module 114.

In accordance with aspects, query embedding module 114 may receive the query text string and may generate a query vector embedding from the query text string, as described here. Query embedding module 114 may then send the query vector embedding to similarity engine 116.

Similarity engine 116 may execute a similarity function to determine textual document data that are above a similarity threshold with respect to a received query vector embedding. In an exemplary aspect, similarity engine 116 may search vector database 126 for, e.g., a top N number of similar documents as measured by a similarity function such as cosine similarity. Similarity engine 116 may identify document identifiers that are related to the chunk vector embeddings that are determined to be similar (e.g., the top N number of similar documents). Similarity engine 116 may send the determined document identifiers to, e.g., query management engine 112 for further processing.

In accordance with aspects, query management engine 112 may query document pool 124 to retrieve documents or text chunks (i.e., textual document data) that are stored with a relation to the document identifiers identified by similarity engine 116. Query management engine 112 may then include a query text string received (e.g., received from client device 102), the retrieved textual document data, and the corresponding document identifiers to generative model engine 118.

Generative model engine 118 may be a public or commercial generative model engine. Generative model engine 118 may be provided by a third party and may publish a public API. Query platform 110 (e.g., query management engine 112) may be configured to access generative model engine 118 via a public API gateway. Generative model engine 118 may be offered as a commercial service (e.g., a subscription service having a cost associated with its use). While generative model engine 118 is depicted as part of query platform 110, generative model engine 118 may be provided as a separate system that is in operative communication with query platform 110 via a public computer network such as the internet. Generative model engine 118 may also be private to query platform 110 (e.g., private to an organization that implements query platform 110). A private implementation of generative model engine 118 may also publish an API, but the API may only be accessible to components of query platform 110 or components provided by or associated with an implementing organization's technology infrastructure.

Query platform 110 may submit a query text string, retrieved textual document data, and corresponding document identifiers to generative model engine 118. The submission may be via a method call to an API method published by the generative model engine. The generative model engine may be configured to formulate a response to the query text string based on the textual document data. The generative model engine may be configured to formulate a return response to the submitted data that includes a natural language response to the submitted query text string and one or more document identifiers that are associated with the textual document data (i.e., the document(s) and/or text chunk(s)) on which the response was based. The return response may be a return function of a called API method.

In accordance with aspects, query platform 110 (e.g., query management engine 112) may receive the natural language response and the relevant document identifiers from a generative model engine and may update a query prompt of a provided interface with the natural language response and the document identifiers that are related to the documents on which the natural language response was generated. A provided interface may display the natural language response and the document identifiers to an end user via the provide interface (e.g., an end user of client device 102).

Figure 4:
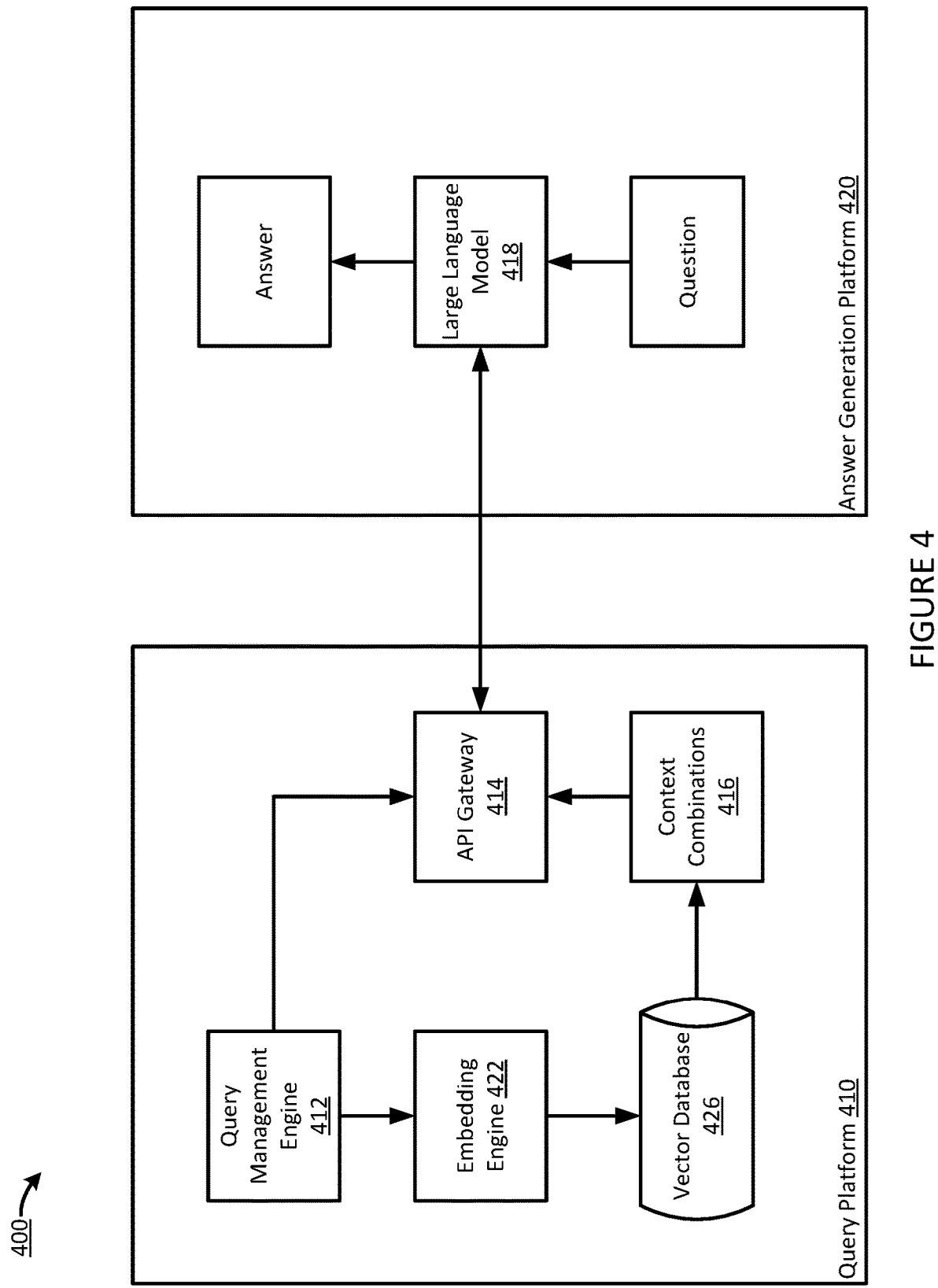
FIG. 4 is a block diagram of a system for decoupled input for a query management engine and a generative model, in accordance with aspects.

FIG. 4 is a block diagram of a system for decoupled input for a query management engine and a generative model, in accordance with aspects. FIG. 4 includes query platform 410 and answer generation platform 420. Query platform 410 includes query management engine 412, embedding engine 422, vector database 426, context combinations 416, and API gateway 414. Answer generation platform 420 includes large language model 418.

In accordance with aspects, query management engine 412 may receive multiple context-based questions from a client device. The questions (i.e., queries) may be natural language questions (e.g., an interrogative sentence). Query management engine 412 may pass the question to embedding engine 422, which may generate a query vector embedding from the question. The query vector embedding may then be used to search vector database 426 for similar chunk vector embeddings and associated context combinations. Context combinations 416 retrieved based on the search of vector database 426 may then be passed to API gateway 414. Query management engine 412 may also pass the text of the received question to API gateway 414. API gateway 414 may pass the text of the received question and the related context combinations to large language model 418, which may be offered as a commercial service on a separate platform. Large language model 418 may generate a response to the received question based on related context combinations.

Figure 2:
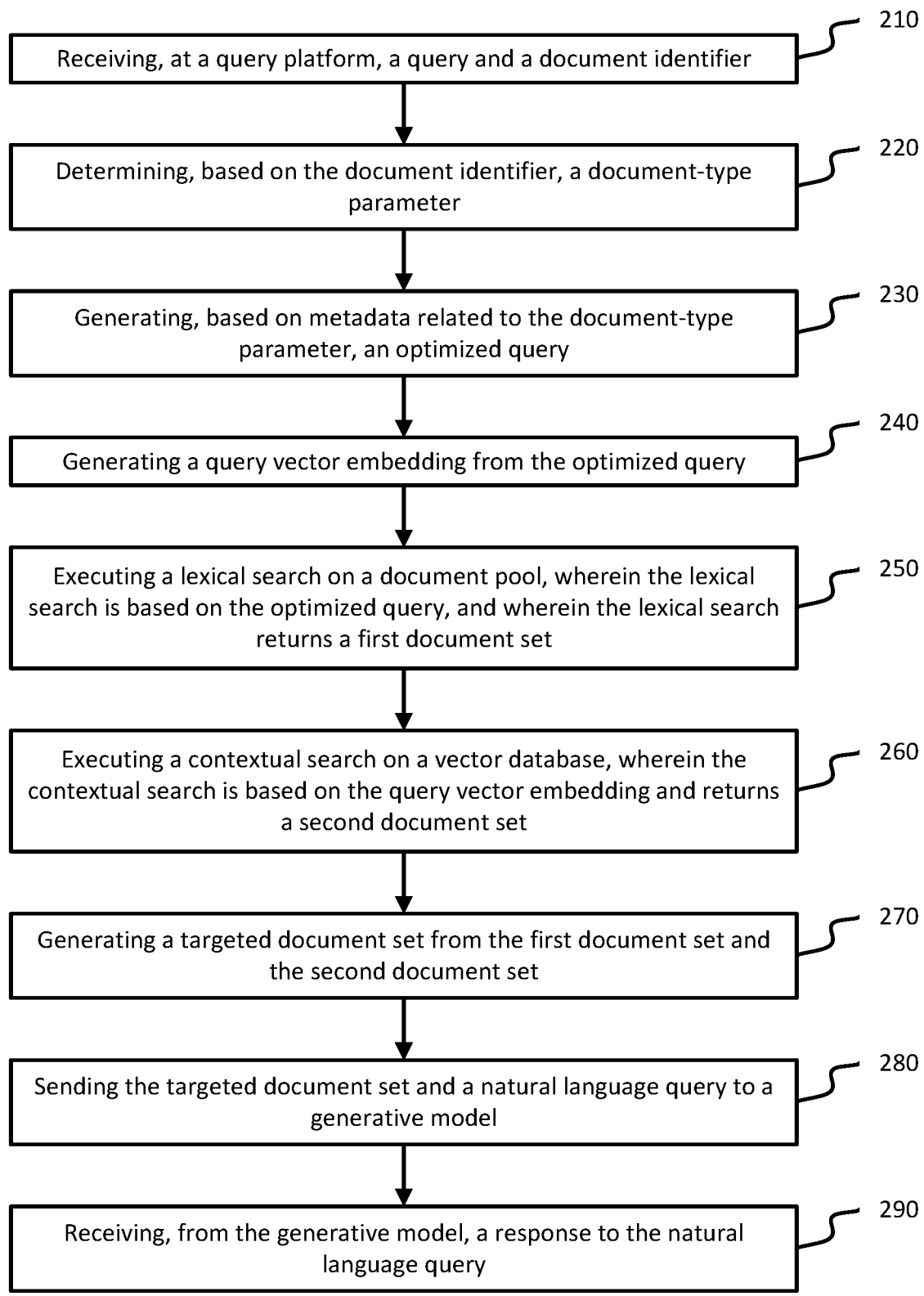
FIG. 2 is a logical flow for generating a targeted document set for input to a generative model, in accordance with aspects.

FIG. 2 is a logical flow for generating a targeted document set for input to a generative model, in accordance with aspects.

Step 210 includes receiving, at a query platform, a query and a document identifier.

Step 220 includes determining, based on the document identifier, a document-type parameter.

Step 230 includes generating, based on metadata related to the document-type parameter, an optimized query.

Step 240 includes generating a query vector embedding from the optimized query.

Step 250 includes executing a lexical search on a document pool, wherein the lexical search is based on the optimized query, and wherein the lexical search returns a first document set.

Step 260 includes executing a contextual search on a vector database, wherein the contextual search is based on the query vector embedding and returns a second document set.

Step 270 includes generating a targeted document set from the first document set and the second document set.

Step 280 includes sending the targeted document set and a natural language query to a generative model.

Step 290 includes receiving, from the generative model, a response to the natural language query.

Figure 3:
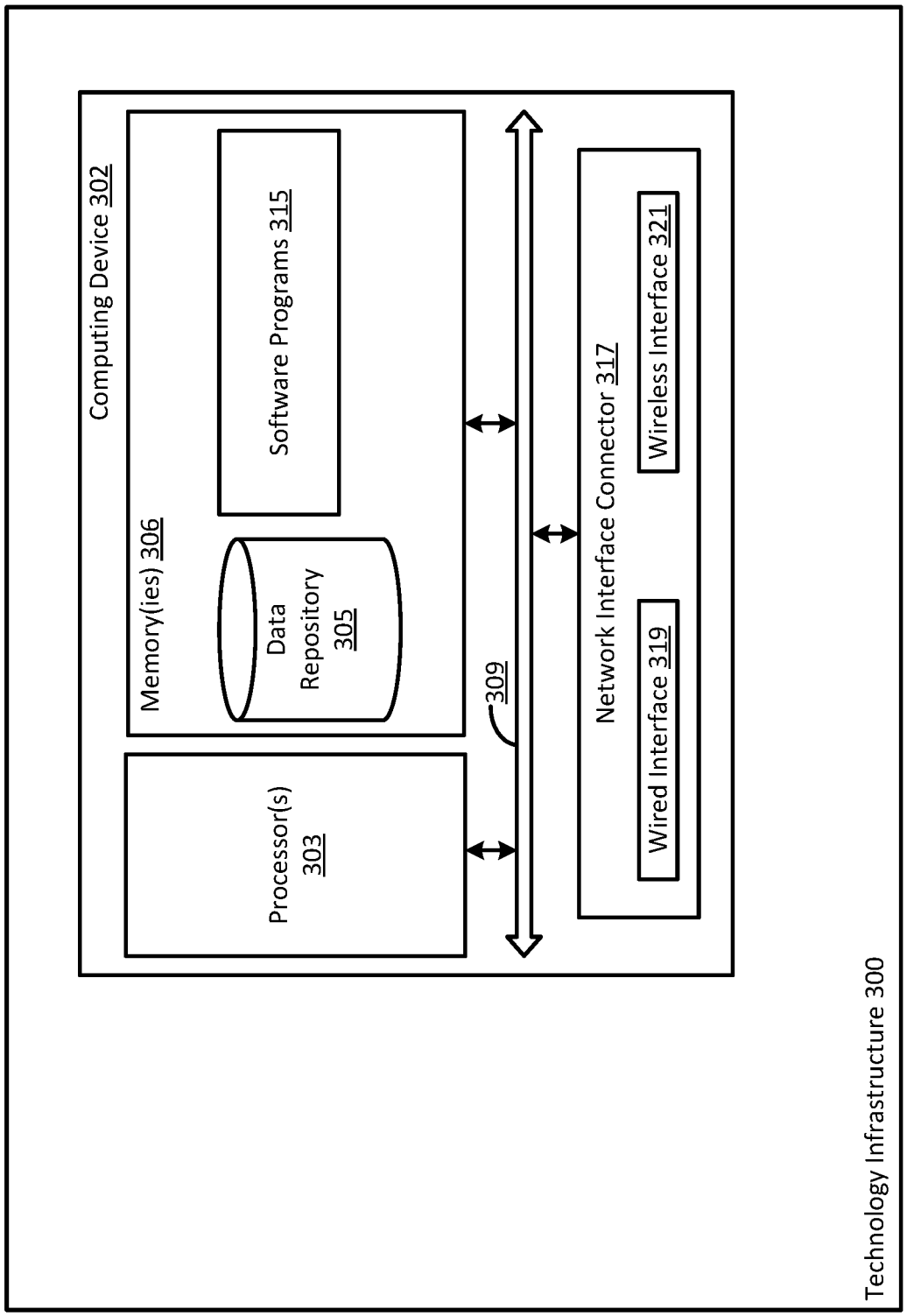
FIG. 3 is a block diagram of a technology infrastructure and computing device for implementing certain aspects of the present disclosure, in accordance with aspects.

FIG. 3 is a block diagram of a technology infrastructure and computing device for implementing certain aspects of the present disclosure, in accordance with aspects. FIG. 3 includes technology infrastructure 300. Technology infrastructure 300 represents the technology infrastructure of an implementing organization. Technology infrastructure 300 may include hardware such as servers, client devices, and other computers or processing devices. Technology infrastructure 300 may include software (e.g., computer) applications that execute on computers and other processing devices. Technology infrastructure 300 may include computer network mediums, and computer networking hardware and software for providing operative communication between computers, processing devices, software applications, procedures and processes, and logical flows and steps, as described herein.

Exemplary hardware and software that may be implemented in combination where software (such as a computer application) executes on hardware. For instance, technology infrastructure 300 may include webservers, application servers, database servers and database engines, communication servers such as email servers and SMS servers, client devices, etc. The term "service" as used herein may include software that, when executed, receives client service requests and responds to client service requests with data and/or processing procedures. A software service may be a commercially available computer application or may be a custom-developed and/or proprietary computer application. A service may execute on a server. The term "server" may include hardware (e.g., a computer including a processor and a memory) that is configured to execute service software. A server may include an operating system optimized for executing services. A service may be a part of, included with, or tightly integrated with a server operating system. A server may include a network interface connection for interfacing with a computer network to facilitate operative communication between client devices and client software, and/or other servers and services that execute thereon.

Server hardware may be virtually allocated to a server operating system and/or service software through virtualization environments, such that the server operating system or service software shares hardware resources such as one or more processors, memories, system buses, network interfaces, or other physical hardware resources. A server operating system and/or service software may execute in virtualized hardware environments, such as virtualized operating system environments, application containers, or any other suitable method for hardware environment virtualization.

Technology infrastructure 300 may also include client devices. A client device may be a computer or other processing device including a processor and a memory that stores client computer software and is configured to execute client software. Client software is software configured for execution on a client device. Client software may be configured as a client of a service. For example, client software may make requests to one or more services for data and/or processing of data. Client software may receive data from, e.g., a service, and may execute additional processing, computations, or logical steps with the received data. Client software may be configured with a graphical user interface such that a user of a client device may interact with client computer software that executes thereon. An interface of client software may facilitate user interaction, such as data entry, data manipulation, etc., for a user of a client device.

A client device may be a mobile device, such as a smart phone, tablet computer, or laptop computer. A client device may also be a desktop computer, or any electronic device that is capable of storing and executing a computer application (e.g., a mobile application). A client device may include a network interface connector for interfacing with a public or private network and for operative communication with other devices, computers, servers, etc., on a public or private network.

Technology infrastructure 300 includes network routers, switches, and firewalls, which may comprise hardware, software, and/or firmware that facilitates transmission of data across a network medium. Routers, switches, and firewalls may include physical ports for accepting physical network medium (generally, a type of cable or wire—e.g., copper or fiber optic wire/cable) that forms a physical computer network. Routers, switches, and firewalls may also have "wireless" interfaces that facilitate data transmissions via radio waves. A computer network included in technology infrastructure 300 may include both wired and wireless components and interfaces and may interface with servers and other hardware via either wired or wireless communications. A computer network of technology infrastructure 300 may be a private network but may interface with a public network (such as the internet) to facilitate operative communication between computers executing on technology infrastructure 300 and computers executing outside of technology infrastructure 300.

FIG. 3 further depicts exemplary computing device 302. Computing device 302 depicts exemplary hardware that executes the logic that drives the various system components described herein. Servers and client devices may take the form of computing device 302. While shown as internal to technology infrastructure 300, computing device 302 may be external to technology infrastructure 300 and may be in operative communication with a computing device internal to technology infrastructure 300.

In accordance with aspects, system components such as a query platform, a query management engine, a chunking engine, a similarity engine, a query embedding module, a generative model engine, client devices, servers, various database engines and database services including a document pool and a vector database, and other computer applications and logic may include, and/or execute on, components and configurations the same, or similar to, computing device 302.

Computing device 302 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 302 may also have user interface components, such as a screen for displaying graphical user interfaces and receiving input from the user, a mouse, a keyboard and/or other input/output components (not shown).

In accordance with aspects, services, modules, engines, etc., described herein may provide one or more application programming interfaces (APIs) in order to facilitate communication with related/provided computer applications and/or among various public or partner technology infrastructures, data centers, or the like. APIs may publish various methods and expose the methods, e.g., via API gateways. A published API method may be called by an application that is authorized to access the published API method. API methods may take data as one or more parameters or arguments of the called method. In some aspects, API access may be governed by an API gateway associated with a corresponding API. In some aspects, incoming API method calls may be routed to an API gateway and the API gateway may forward the method calls to internal services/modules/engines that publish the API and its associated methods.

A service/module/engine that publishes an API may execute a called API method, perform processing on any data received as parameters of the called method, and send a return communication to the method caller (e.g., via an API gateway). A return communication may also include data based on the called method, the method's data parameters and any performed processing associated with the called method.

API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and private communication channels such as private computer networks or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Representational State Transfer), or the like.

The various processing steps, logical steps, and/or data flows depicted in the figures and described in greater detail herein may be accomplished using some or all of the system components also described herein. In some implementations, the described logical steps or flows may be performed in different sequences and various steps may be omitted. Additional steps may be performed along with some, or all of the steps shown in the depicted logical flow diagrams. Some steps may be performed simultaneously. Some steps may be performed using different system components. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing device," a "computing device," a "computer," an "electronic device," a "mobile device," a "client device," a "server," etc. As used herein, these terms (unless otherwise specified) are to be understood to include at least one processor that uses at least one memory. The at least one memory may store a set of instructions. The instructions may be either permanently or temporarily stored in the memory or memories of the processing device. The processor executes the instructions that are stored in the memory or memories in order to process data. A set of instructions may include various instructions that perform a particular step, steps, task, or tasks, such as those steps/tasks described above, including any logical steps or logical flows described above. Such a set of instructions for performing a particular task may be characterized herein as an application, computer application, program, software program, service, or simply as "software." In one aspect, a processing device may be or include a specialized processor. As used herein (unless otherwise indicated), the terms "module," and "engine" refer to a computer application that executes on hardware such as a server, a client device, etc. A module or engine may be a service.

As noted above, the processing device executes the instructions that are stored in the memory or memories to process data. This processing of data may be in response to commands by a user or users of the processing device, in response to previous processing, in response to a request by another processing device and/or any other input, for example. The processing device used to implement the invention may utilize a suitable operating system, and instructions may come directly or indirectly from the operating system.

The processing device used to implement the invention may be a general-purpose computer. However, the processing device described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing device be physically located in the same geographical place. That is, each of the processors and the memories used by the processing device may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing device what to do with the data being processed.

Further, it is appreciated that the instructions or set of instructions used in the implementation and operation of the invention may be in a suitable form such that the processing device may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing device, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing device, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing device, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing device that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing device or machines that are used to implement the invention. As used herein, a user interface includes any hardware, software, or combination of hardware and software used by the processing device that allows a user to interact with the processing device. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing device as it processes a set of instructions and/or provides the processing device with information. Accordingly, the user interface is any device that provides communication between a user and a processing device. The information provided by the user to the processing device through the user interface may be in the form of a command, a selection of data, or some other input, for example.

As discussed above, a user interface is utilized by the processing device that performs a set of instructions such that the processing device processes data for a user. The user interface is typically used by the processing device for interacting with a user either to convey information or receive information from the user. However, it should be appreciated that in accordance with some aspects of the system and method of the invention, it is not necessary that a human user actually interact with a user interface used by the processing device of the invention. Rather, it is also contemplated that the user interface of the invention might interact, i.e., convey and receive information, with another processing device, rather than a human user. Accordingly, the other processing device might be characterized as a user. Further, it is contemplated that a user interface utilized in the system and method of the invention may interact partially with another processing device or processing devices, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:
   receiving, at a query platform, a natural language query and a document identifier;
   determining, based on the document identifier, a document-type parameter including a description of a document associated with the document identifier;
   generating, based on metadata related to the document-type parameter and a keyword from the document, an optimized query;
   generating a query vector embedding from the optimized query;
   executing a lexical search on a document pool, wherein the lexical search is based on the optimized query, and wherein the lexical search returns a first document set based on relevancy;
   executing a contextual search on a vector database, wherein the contextual search is based on the query vector embedding and returns a second document set based on a mathematical similarity measurement between the query vector embedding and chunk vector embeddings related to documents in the second document set;
   generating a targeted document set from the first document set and the second document set, the targeted document set comprising a combination of twenty-five percent of the first document set and seventy-five percent of the second document set;
   sending a context, comprising the targeted document set, and the natural language query to a generative model; and
   receiving, from the generative model, a response to the natural language query.

2. The method of claim 1, wherein the natural language query is the optimized query.

3. The method of claim 1, wherein the lexical search matches terms in the optimized query to metadata tags related to text chunks.

4. The method of claim 3, wherein the text chunks are related to documents included in the first document set.

5. A system comprising at least one computer including a processor and a memory, wherein the at least one computer is configured to:
   receive, at a query platform, a natural language query and a document identifier;
   determine, based on the document identifier, a document-type parameter including a description of a document associated with the document identifier;
   generate, based on metadata related to the document-type parameter and a keyword from the document, an optimized query;
   generate a query vector embedding from the optimized query;
   execute a lexical search on a document pool, wherein the lexical search is based on the optimized query, and wherein the lexical search returns a first document set based on relevancy;
   execute a contextual search on a vector database, wherein the contextual search is based on the query vector embedding and returns a second document set based on a mathematical similarity measurement between the query vector embedding and chunk vector embeddings related to documents in the second document set;
   generate a targeted document set from the first document set and the second document set, the targeted document set comprising a combination of twenty-five percent of the first document set and seventy-five percent of the second document set;
   send the targeted document set and the natural language query to a generative model; and
   receive, from the generative model, a response to the natural language query.

6. The system of claim 5, wherein the contextual search returns the second document set based on a mathematical similarity measurement between the query vector embedding and chunk vector embeddings related to documents in the second document set.

7. The system of claim 5, wherein the natural language query is the optimized query.

8. The system of claim 5, wherein the lexical search matches terms in the optimized query to metadata tags related to text chunks.

9. The system of claim 8, wherein the text chunks are related to documents included in the first document set.

10. A non-transitory computer readable storage medium, including instructions stored thereon, which instructions, when read and executed by one or more computer processors, cause the one or more computer processors to perform steps comprising:

receiving, at a query platform, a natural language query and a document identifier;

determining, based on the document identifier, a document-type parameter including a description of a document associated with the document identifier;

generating, based on metadata related to the document-type parameter and a keyword from the document, an optimized query;

generating a query vector embedding from the optimized query;

executing a lexical search on a document pool, wherein the lexical search is based on the optimized query, and wherein the lexical search returns a first document set based on relevancy;

executing a contextual search on a vector database, wherein the contextual search is based on the query vector embedding and returns a second document set based on a mathematical similarity measurement between the query vector embedding and chunk vector embeddings related to documents in the second document set;

generating a targeted document set from the first document set and the second document set, the targeted document set comprising a combination of twenty-five percent of the first document set and seventy-five percent of the second document set;

sending the targeted document set and the natural language query to a generative model; and receiving, from the generative model, a response to the natural language query.

11. The non-transitory computer readable storage medium of claim 10, wherein the natural language query is the optimized query.

12. The non-transitory computer readable storage medium of claim 10, wherein the lexical search matches terms in the optimized query to metadata tags related to text chunks, and wherein the text chunks are related to documents included in the first document set.

* * * * *